US009927225B2

(12) United States Patent
Min et al.

(10) Patent No.: US 9,927,225 B2
(45) Date of Patent: Mar. 27, 2018

(54) MEASURING DYNAMIC DISPLACEMENT (71) Applicant: The Arizona Board of Regents on Behalf of the University of Arizona, Tucson, AZ (US)

(72) Inventors: Jaehong Min, Tucson, AZ (US); Nikolas Jorge Gelo, Tucson, AZ (US); Hongki Jo, Tucson, AZ (US)

(73) Assignee: THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 56 days.

(21) Appl. No.: 15/168,976

(22) Filed: May 31, 2016

(65) Prior Publication Data
US 2016/0349040 A1    Dec. 1, 2016

Related U.S. Application Data (60) Provisional application No. 62/167,546, filed on May 28, 2015.

(51) Int. Cl.
*G06K 9/00* (2006.01)
*G01B 11/14* (2006.01)
(Continued)

(52) U.S. Cl.
CPC ............ *G01B 11/14* (2013.01); *G01B 11/002* (2013.01); *G06T 7/20* (2013.01); *G06T 7/90* (2017.01); *G06T 2207/10016* (2013.01)

(58) Field of Classification Search
CPC . G01B 11/14; G06T 7/20; G06T 2207/10016; G06T 7/90
(Continued)

(56) References Cited

U.S. PATENT DOCUMENTS

| 5,173,945 | A | * | 12/1992 | Pieters | ................. | G01S 3/7864 |
|---|---|---|---|---|---|---|
| | | | | | | 244/135 A |
| 6,062,562 | A | * | 5/2000 | Pardee | ..................... | A63F 3/02 |
| | | | | | | 273/243 |
| 2015/0142322 | A1 | * | 5/2015 | Okamoto | ............... | G01V 1/008 |
| | | | | | | 702/15 |

OTHER PUBLICATIONS

Casciati, F. and Fuggini, C. (2009), "Engineering vibration monitoring by GPS: long duration records," Earthquake Engineering and Engineering Vibration, Vos. 8(3), 459-467.*

(Continued)

*Primary Examiner* — Gregory F Cunningham
(74) *Attorney, Agent, or Firm* — Blank Rome LLP (57) ABSTRACT

Disclosed are methods of measuring dynamic displacement of an object. The methods include capturing a plurality of images of a dynamically moving object. The object may include one or two color-patterned target(s) that include two rows and two columns of two contrasting colors (e.g., colors with a difference in hue values of approximately 180). The methods include identifying a reference point of the object (e.g., a center of a color-patterned target or a midpoint between the centers of two color-patterned targets) and measuring the dynamic movement (displacement) of the reference point over time. The images may be captured by a smartphone camera and the smartphone may identify and measure the dynamic movement of the reference point. In view of the constraints of smartphone hardware capabilities, the images may be cropped and/or not displayed to enable the smartphone to process the images and measure the dynamic displacement in real time.

20 Claims, 8 Drawing Sheets

(51) Int. Cl.
  *G06T 7/20*  (2017.01)
  *G06T 7/90*  (2017.01)
  *G01B 11/00*  (2006.01)

(58) Field of Classification Search
  USPC .......................................................... 382/107
  See application file for complete search history.

(56) References Cited

OTHER PUBLICATIONS

15168976_NPL_IDS_documents, dated Sep. 13, 2017.*
Fujino, Y., Murata, M., Okano, S., and Takeguchi, M. (2000), "Monitoring system of the Akashi Kaikyo Bridge and displacement measurement using GPS," *Proc. of SPIE, nondestructive evaluation of highways, utilities, and pipelines IV*, 229-236.
Casciati, F. and Fuggirii, C. (2009), "Engineering vibration monitoring by GPS: long duration records," *Earthquake Engineering and Engineering Vibration*, vol. 8(3), 459-467.
Yi, T.H., Li, H.N., and Gu, M. (2012). "Recent research and applications of GPS based monitoring technology for high-rise structures," *Structural Control and Health Monitoring*, Published online, DOI: 10.1002/stc.1501.
Jo, H., Sim, S.H., Talkowski, A., Spencer Jr., B.F., and Nelson, M.E. (2012), "Feasibility of Displacement Monitoring using Low-cost GPS Receivers", *Structural Control and Health Monitoring*, 20(9), 1240-1254.
Malesa M, Szczepanek D, Kujawinska M, Swiercz A, Kolakowski P. (2010), "Monitoring of civil engineering structures using digital image correlation technique", *ICEM 14-14th International conference on experimental mechanics*. Poitiers, France.
Caetano, E., Silva, S., Bateira, J., (2011), "A vision system for vibration monitoring of civil engineering structures", *Experimental Techniques*, 74-82.
Bell E, Peddle J, Goudreau A. (2012), "Bridge condition assessment using digial image correlation and structural modeling", *IABMAS'12—Bridge maintenance, safety management, resilience and sustainability*, Dubrovnik, Croatia, 330-7.
Ji, Y.F. and Zhang, O.W. (2012), "A novel image-based approach for structural displacement measurement", *Proc. 6th Int. Conf. Bridge Maintenance, Safety Manag.*, 407-414.
Ribeiro, D., Calcada, R., Ferreira, J., and Martins, T. (2014), "Non-contact measurement of the dynamic displacement of railway bridges using an advanced videobased system", *Engineering Structures*, 75, 164-180.
Ho, H.N., Lee, J.H., Park, Y.S., & Lee, J.J. (2012), "A Synchronized Multipoint Vision-Based System for Displacement Measurement of Civil Infrastructures", *The Scientific World Journal*.

Fukuda, Y., Feng, M., Narita, Y., Kaneko, S.I., & Tanaka, T. (2010), "Vision-based displacement sensor for monitoring dynamic response using robust object search algorithm", .*Sensors. IEEE*, 1928-1931.
D'Emilia, G., Razzè, L., & Zappa, E. (2013), "Uncertainty analysis of high frequency image-based vibration measurements", *Measurement*, 46(8), 2630-2637.
"IPhone 5." *Wikipedia*. Wikimedia Foundation, Apr. 11, 2014. Web. Nov. 4, 2014 (http://en.wikipedia.org/wiki/IPhone_5).
"IPhone 5S." *Wikipedia*. Wikimedia Foundation, May 11, 2014. Web. Nov. 4, 2014 (http://en.wikipedia.org/wiki/IPhone_5S).
"IPhone 6." *Wikipedia*. Wikimedia Foundation, Jul. 11, 2014. Web. Nov. 4, 2014 (http://en.wikipedia.org/wiki/IPhone_6).
"Samsung Galaxy S5." *Wikipedia*. Wikimedia Foundation, Jun. 11, 2014. Web. Nov. 4, 2014 (http://en.wikipedia.org/wiki/Samsung-_Galaxy_S5).
"LG G3." *Wikipedia*. Wikimedia Foundation, Jan. 11, 2014. Web. Nov. 4, 2014 (http://en.wikipedia.org/wiki/LG_G3).
http://appleinsider.com/articles/14/08/22/while-91-of-apple-users-run-ios-7-fivedifferent-versions-of-android-hold-10-share, Aug. 22, 2014.
http://www.theguardian.com/technology/2014/aug/22/android-fragmented-developersopensignal.
"LG G3 Review." *TechSpot*. N.p., n.d. Web. Nov. 7, 2014 (http://www.techspot.com/review/847-lg-g3/page5.html).
Deori, B., and Thounaojam, D.M. (2014), "A Survey on Moving Object Tracking in Video", *International Journal on Information Theory (IJIT)*, 3(3).
Li, L., Ranganath, S., Weimin, H., and Sengupta, K. (2005), "Framework for Real-Time Behavior Interpretation From Traffic Video", *IEEE Tran. On Intelligen Transportation Systems*, 6(1), 43-53.
Kumar, P., Weimin, H., Gu, I.U., and Tian, Q. (2004), "Statistical Modeling of Complex Backgrounds for Foreground Object Detection", *IEEE Trans. On Image Processing*, 13(11), 43-53.
Serby, D., Meier, E.K., and Gool, L.V., (2004), "Probabilistic Object Tracking Using Multiple Features", *IEEE Proc. of International Conf on Pattern Recognition Intelligent Transportation Systems*, 6, 43-53.
Zivkovi, Z. (2004), "Improving the selection of feature points for tracking", Pattern *Analysis and Applications*, 7(2).
Lou, J., Tan, T., Hu, W., Yang, H., and Maybank, S.J. (2005), "3D Model-Based Vehicle Tracking", *IEEE Trans. on Image Processing*, 14, 1561-1569.
"OpenCV." Web. Nov. 7, 2014 (http://opencv.org/).
"BradLarson/GPUImage." *GitHub.*, Web. Nov. 4, 2014 (https://github.com/BradLarson/GPUImage).
Nagayama, T., and Spencer, B. F., Jr. (2007). "Structural health monitoring using smart sensors." *Newmark Structural Engineering Laboratory (NSEL) Rep. Series No. 1*,Univ. of Illinois at Urbana-Champaign, Champaign, IL.

* cited by examiner

MEASURING DYNAMIC DISPLACEMENT

CROSS-REFERENCE TO RELATED APPLICATIONS

This application claims priority to U.S. Prov. Pat. Appl. No. 62/167,546, filed May 28, 2015, which is incorporated herein by reference in its entirety.

STATEMENT REGARDING FEDERALLY SPONSORED RESEARCH

Not applicable

BACKGROUND

The process of implementing a damage detection and characterization strategy for engineering structures is generally referred to as structural health monitoring (SHM). When permanent deformation occurs, structural displacement or deformation information is particularly important and it is often more accurate than acceleration measurements in lower-frequency ranges.

Conventional methods for displacement monitoring, which include GPS-based methods and computer vision-based methods, each have their own drawbacks. The cost for survey-level, dual-frequency GPS systems that support subcentimeter accuracy is still too high for routine use. Meanwhile, single-frequency, low-cost GPS devices that are generally used for navigation purposes are not sufficiently advanced for practical use in SHM applications.

Computer vision-based methods use a video camera (generally in combination with an optical zoom lens and lighting lamps) that capture images of a precision target attached to a location of interest on a structure over time. Non-contact, vision-based systems are available at relatively low cost and significantly reduce the difficulties in providing stationary reference points (a critical challenge for contact-type displacement sensors). Conventional video cameras, however, have a number of drawbacks. The limited resolution of conventional video cameras causes difficulty in identifying high-frequency displacements, which have smaller amplitudes than low-frequency vibrations. At higher resolutions, the maximum frame rates of conventional video cameras are limited to 30-60 frames per second. While those low frame rates may be sufficient for measuring low-frequency and high-amplitude vibrations of long-period structures such as high-rise buildings and long-span cable-supported bridges, higher frame rates are essential for appropriately monitoring the dynamic behavior of many of small-to-mid scale structures. Additionally, anti-aliasing filters are not available for conventional vision-based measuring systems. While a high-speed camera (allowing up to 2000 frames per second) may minimize such aliasing problems, the practical use of such expensive cameras for civil engineering applications is still in question because of the level of cost and the difficulty of achieving real-time processing.

Recent advances in smartphone technologies provide various onboard sensing capabilities. In particular, the embedded cameras included in many smartphones provide higher resolution images and higher frame rates than many conventional video cameras. Moreover, their powerful processors and memories allow for onboard processing capabilities, eliminating the need for additional computers to perform extensive image processing. Meanwhile, because of their many general purpose functions (e.g., cellular telephony, text messaging, or internet access, etc.), smartphones are nearly ubiquitous.

Accordingly, there is a need to measure dynamic and absolute displacement by a smartphone.

While the processing power of currently-available smartphones is increasing, smartphone capabilities are still limited when compared to desktop computing devices that can include hardware and software selected for their proficiency regarding computer vision applications. Therefore, in order to quickly and accurately measure both low-frequency, high-amplitude vibrations and high-frequency, low-amplitude vibrations using currently-available smartphone technology, the process must be optimized.

SUMMARY

According to an aspect of an exemplary embodiment, there is provided a method of measuring dynamic and absolute displacement by a smartphone, including capturing a plurality of images of a dynamically moving object, identifying a reference point of the dynamically moving object in the plurality of images, and measuring dynamic displacement of the reference point over time.

According to an aspect of another exemplary embodiment, there is provided a non-transitory computer readable storage medium that stores instructions that, when executed by one or more smartphone processors, cause the smartphone to capture a plurality of images of a dynamically moving object, identify a reference point of the dynamically moving object in the plurality of images, and measure dynamic displacement of the reference point over time.

According to an aspect of another exemplary embodiment, there is provided a smartphone (including non-transitory computer readable storage media and one or more processors) that captures a plurality of images of a dynamically moving object, identifies a reference point of the dynamically moving object in the plurality of images, and measures dynamic displacement of the reference point over time.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments, wherein.

DETAILED DESCRIPTION

Reference will now be made in detail to exemplary embodiments by way of reference to the accompanying drawings, wherein like reference numerals refer to like parts, components, and structures.

Figure 1:
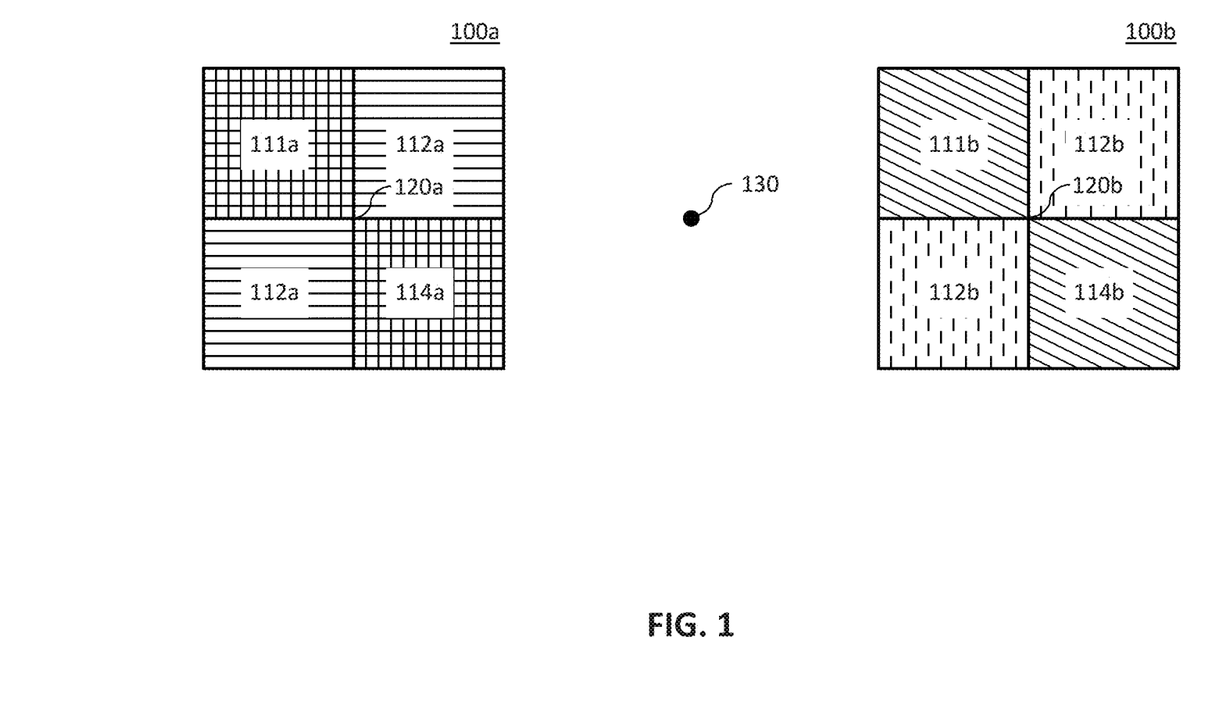
FIG. 1 is a diagram illustrating a color-patterned targets and according to an exemplary embodiment of the present invention.

FIG. 1 is a diagram illustrating color-patterned targets 100a and 100b according to an exemplary embodiment of the present invention. In order to measure the dynamic and absolute displacement of an object (e.g., a structure), one or more color-patterned targets 100a and 100b may be affixed to the structure. As shown in FIG. 1, for example, the color-patterned target 100a may include four quadrants 111a, 112a, 113a, and 114a, arranged in two columns and two rows, with a center point 120a at the intersection of the four quadrants 111a-114a. Similarly, the color-patterned target 100b may include four quadrants 111b, 112b, 113b, and 114b, arranged in two columns and two rows, with a center point 120b of the four quadrants 111b-114b. The midpoint between the center point 120a and the center point 120b is identified by reference number 130.

In order for a smartphone to accurately identify the location of the center point 120a, the quadrants 111a-114a may be chosen such that each column and each row includes two contrasting colors. (For example, quadrants 111a and 114a may be a first color and quadrants 112a and 113a may be a second color that contrasts with the first color.) Similarly, the quadrants 111b-114b may be chosen such that each column and each row includes two contrasting colors. In order for a smartphone to accurately identify each of the color-patterned targets 100a and 100b, the colors of the color-patterned target 100b may be different than the colors of the first color-patterned target 100a. (For example, quadrants 111b and 114b may be a third color and quadrants 112b and 113b may be a fourth color that contrasts with the third color.)

The contrasting colors may be selected based on the hue values of those colors. Hue values are represented on a 360 degree scale as shown in Table 1:

| Hue | Color |
|---|---|
| 0 degrees | Red |
| 60 degrees | Yellow |
| 120 degrees | Green |
| 180 degrees | Cyan |
| 240 degrees | Blue |
| 300 degrees | Magenta |

For the purposes of this disclosure, colors may be "contrasting" if they have a difference in hue values of between 150 and 210 degrees, more preferably between 170 and 190 degrees, more preferably approximately (i.e., ±5 degrees) 180 degrees. To use one specific example, each row and each column of the color-patterned target 100a may include one yellow quadrant (e.g., quadrants 111a and 114a) and one blue quadrant (e.g., quadrants 112a and 113a) and each row and each column of the color-patterned target 100b may include one green quadrant (e.g., quadrants 111b and 114b) and one magenta quadrant (e.g., quadrants 112b and 113b).

Figure 2:
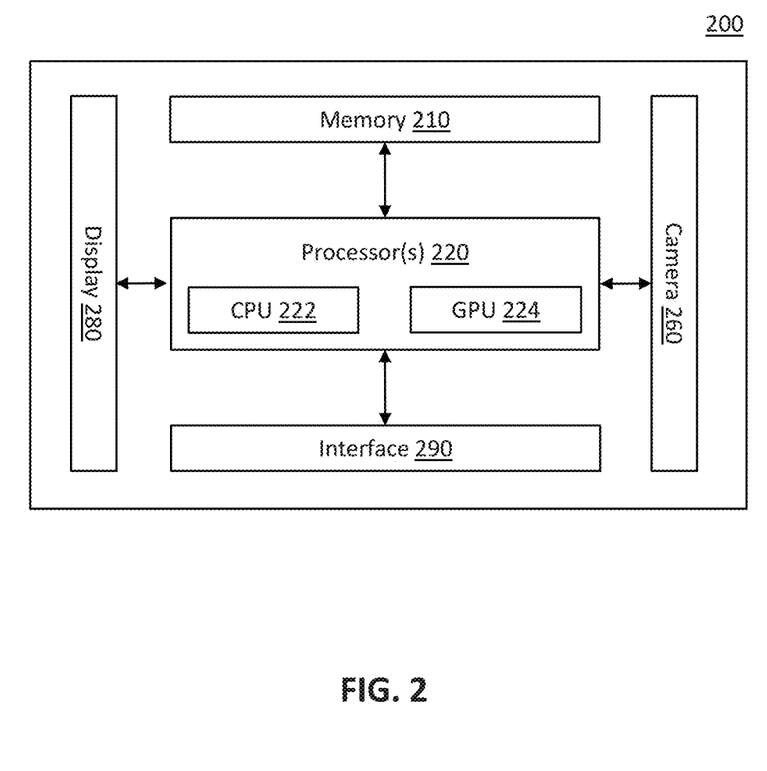
FIG. 2 is a block diagram illustrating a smartphone according to an exemplary embodiment of the present invention.

FIG. 2 is a block diagram illustrating a smartphone 200 according to an exemplary embodiment of the present invention. As shown in FIG. 2, the smartphone 200 includes one or more processors 220, memory 240, a camera 260, and a display 280. The smartphone 200 may also include a hardware interface 290.

The one or more processors 220 may include a central processing unit 222 and a graphics processing unit 224. The central processing unit 222 may be any suitable device that carries out the instructions of a computer program by performing the arithmetic, logical, control and input/output (I/O) operations specified by the instructions. The graphics processing unit 224 may be a specialized electronic circuit designed to rapidly manipulate and alter memory to accelerate the creation of images in a frame buffer. The graphics processing unit 224 may process blocks of visual data in parallel. The central processing unit 222 and a graphics processing unit 224 may be realized as a single semiconductor chip or more than one chip.

The memory 240 may include any non-transitory computer readable storage media (e.g., a hard disk, solid-state memory, etc.) that stores instructions (i.e., computer programs) that, when executed by the one or more processors 222 and/or 224, cause the smartphone 200 to perform the functions described herein.

The camera 260 may be any suitable remote sensing device that captures sequences of images for digital storage in the memory 220. The camera 260 includes an images sensor that detects and conveys the information that constitutes each of the images. The image sensor, for example, may have a graphical resolution of 8 megapixels or greater. The camera 260 preferably captures images with a resolution of 720p (i.e., a horizontal resolution of 720 pixels and a vertical resolution of, for example, 1280 pixels), more preferably with a resolution of 1080p (i.e., a horizontal resolution of 1080 pixels and a vertical resolution of, for example, 1920 pixels), even more preferably with a resolution of 4K (i.e., a horizontal resolution on the order of 4,000 pixels), etc. Depending on the resolution, the camera 260 preferably capture images with a frame rate of 30 frames per second, more preferably with a frame rate of 60 frames per second, even more preferably with a frame rate of 120 frames per second, etc. The images captured by the camera 260 may be stored in the memory 240, processed by the CPU 222 and/or the GPU 224, displayed by the display 280, and/or transferred to an external computing device via the hardware interface 290.

The display 280 may be any suitable output device that presents information, such as the images captured by the camera 260, in visual form. The display 280 may be, for example, a liquid crystal display (LCD), a light emitting polymer display (LPD), an light emitting diode (LED) display, an organic light emitting diode (OLED) display, etc.

The hardware interface 290 may be any suitable interface to enable the smartphone 200 to send to and receive data from an external computing device such as a personal computer. The hardware interface may be, for example, a universal serial bus (USB) port, a thunderbolt port, a lightning port, a FireWire port, etc.

The smartphone 200 includes computer programs that are stored in the memory 240 and executed by the CPU 222 and/or the GPU 224. The computer programs include an operating system, such as the iOS mobile operating system, which is developed by Apple Inc., or the Android mobile operating system, which is developed by Google Inc. The computer programs may also provide functionality, for example, for a user to place telephone calls, to send and receive text messages (e.g., short message service or SMS), multi-media messages (MMS), email messages, etc., to access the internet, etc.

The smartphone 200 also includes computer programs to process images such as color adjustment filters (e.g., an RGB level filter, a hue level filter, a luminance threshold filter, etc.) and image processing filters (a Harris corner detection filter, a Sobel edge detection filter, a Hough transform line detection filter, etc.). The color adjustment filters and/or the image processing filters may be selected from an open source library of computer vision applications, such as the OpenCV library, which was originally developed by Intel, or the Open Graphics library (OpenGL), which was originally developed by Silicon Graphics. The computer programs may also provide the user with functionality to crop images captured by the camera 260.

To track the objects using computer vision, the smartphone 200 detects the objects of interest in a video sequence captured by the camera 260, classifies the detected objects, and tracks the movements of identified targets. In order to minimize processing time, which is necessary to realize a higher frame rate for dynamic displacement monitoring, the smartphone 200 may use a contour/edge-based method to track the color-patterned targets 100a and/or 100b. Alternatively, the smartphone 200 may use another method, such as a region-based or point-based method.

Figure 3:
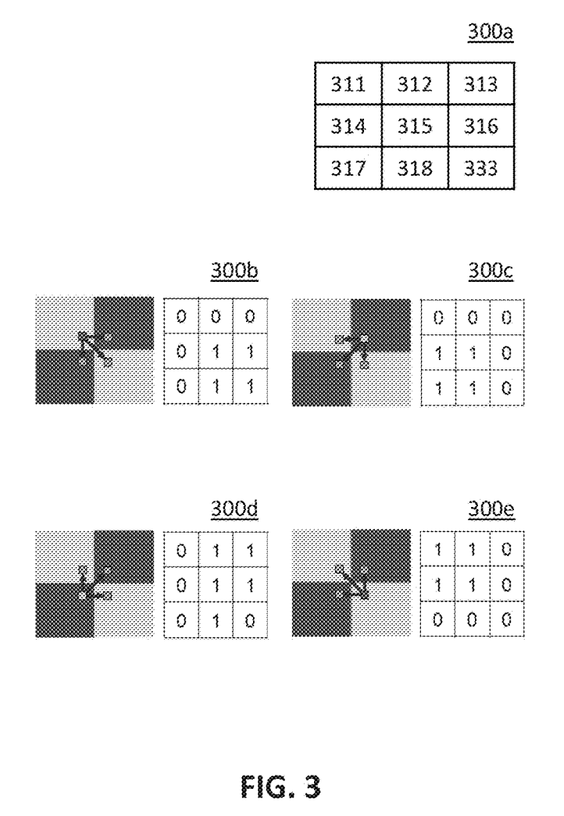
FIG. 3 are diagrams that illustrate a process for identifying a color-patterned target according to an exemplary embodiment of the present invention.

FIG. 3 are diagrams that illustrate a process for identifying a color-patterned target 100a and determining a center point 120a of the color-patterned target 100a according to an exemplary embodiment of the present invention. FIG. 3 includes representations of the color-patterned target 100a and matrices 300a-e, which include cells 311-319.

The color-patterned target 100a may be identified in an image, for example, by converting RGB values of pixels to hue values and filtering the images based on whether the hue values are within thresholds that are predetermined to encompass the hue values of the color-patterned target 100a.

A center point of a color-patterned target 100a may be determined by sampling a pixel location and determining the hue values of the sampled pixel and the neighboring pixels in eight directions of the sampled pixel. The hue value of the sampled pixel is shown in cell 315 and the hue values of the neighboring pixels are shown in cells 311-314 and 316-319.

The GPU 224 processes an image that includes the color-patterned target 100a by highlighting pixels near the center of the color-patterned target 100a and not highlighting pixels that are not near the center of the target. The CPU 222 loads the processed image into memory and finds all of the pixels that were highlighted. The CPU 222 determines the center point 120a of the color-patterned target 100a by averaging the two-dimensional coordinates of each highlighted pixel.

Figure 4:
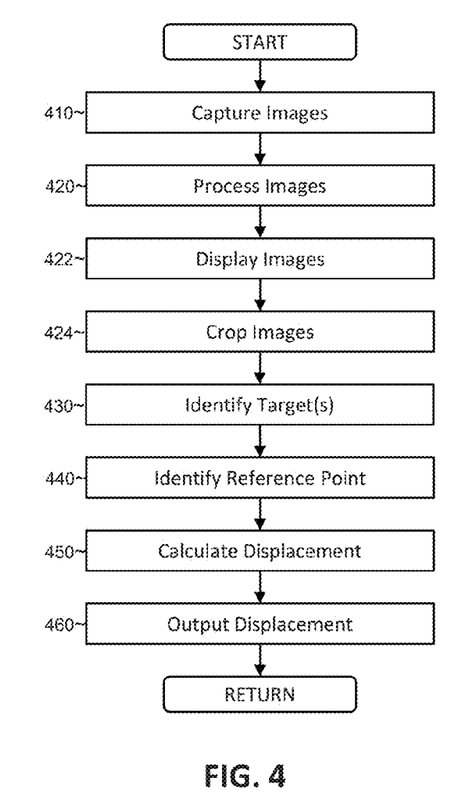
FIG. 4 is a flowchart illustrating a process for measuring dynamic and absolute and dynamic displacement according to an exemplary embodiment of the present invention.

FIG. 4 is a flowchart illustrating a process 400 for measuring dynamic and absolute displacement according to an exemplary embodiment of the present invention. The process 400 may be performed by the smartphone 200.

Images of a dynamically moving object are captured in step 410. The images may be captured by the camera 260 of the smartphone 200. The dynamically moving object may be, for example, the color-patterned target 100a, which may be affixed to a structure. As described above, the color-patterned target 100a may include two rows and two columns, each column and each row including two contrasting colors (e.g., colors having a hue value difference of approximately 180 degrees). Alternatively, the dynamically moving object may be two color-patterned targets 100a and 100b, which may be affixed to a structure. The images may be captured by the smartphone at a frame rate of 120 images per second or more. The frame rate may be set by the user or predetermined and stored in the instructions on the smartphone 200. The images are captured by the smartphone at a resolution of 720p or greater. The resolution may be set by the user or predetermined and stored in the instructions on the smartphone 200.

The images are be processed in step 420. The images may be processed by the smartphone 200 (For example, by the GPU 224). As described above, the smartphone 200 may process the image by converting RGB values of pixels to hue values and filtering the images based on whether the hue values are within predetermined thresholds.

The images (and or graphical representations based on the images) may be displayed in step 422. The images may be displayed, for example, via the display 280 of the smartphone 200.

The images may be cropped in step 424. The images may be cropped by the smartphone 200. The images may be cropped, for example, such that the vertical resolution of each image may be 100 pixels. The horizontal and/or vertical resolution of the cropped images may be set by the user or predetermined and stored in the instructions on the smartphone 200.

One or more color-patterned targets 100a, 100b, etc. are identified in the captured images captured in step 430. The one or more color-patterned targets 100a, 100b, etc. may be identified, for example, by determining whether hue values of pixels are within thresholds that are predetermined to encompass the hue values of the color-patterned targets 100a, 100b, etc.

A reference point is identified in the images in step 440. The reference point may be identified by the smartphone 200. The reference point may be, for example, the center point 120a of the color-patterned target 100a. Alternatively, the reference point may be the midpoint 130 between the center points 120a and 120b. The smartphone 200 may estimate the center point 120a and/or 120b by identifying pixels near the center of the color-patterned target 100a and/or 100b and determining an average location of the pixels near the center of the color-patterned target 100a and/or 100b. The pixels near the center of the color-patterned targets 100a and/or 100b may be identified by converting red-green-blue (RGB) values of image pixels to hue values and determining whether the hue values are within a predetermined range using a hue value filter.

Displacement of the reference point is calculated in step 450. The displacement of the reference point may be calculated by the smartphone 200.

Information indicative of the dynamic displacement of the reference point over time is output in step 460. The information may be output the smartphone 200. The smartphone 200 may display the information via the display 280. For example, by the smartphone may display a graph of the displacement of the reference point over time. Additionally or alternatively, the smartphone 200 may output the information to an external computing device via the hardware interface 290.

After outputting information indicative of the dynamic displacement of the reference point in output in step 460, the process 400 may return to step 410 in order to continue determining the dynamic displacement of the reference point over time.

In order for a smartphone 200 to identify one or more color-patterned targets 100a in a camera frame and calculate its displacement at each frame within a certain time period (e.g., 10 milliseconds on the iPhone 6 Plus), the process 500 may be optimized. For example, the software instructions may be such that the smartphone 200 does not display the images captured by the camera 260 on the display 280. In another example, the software instructions may be such that all operations related to the camera 260 are run on a separate thread and all user interface operations are run on the main thread.

Figure 5:
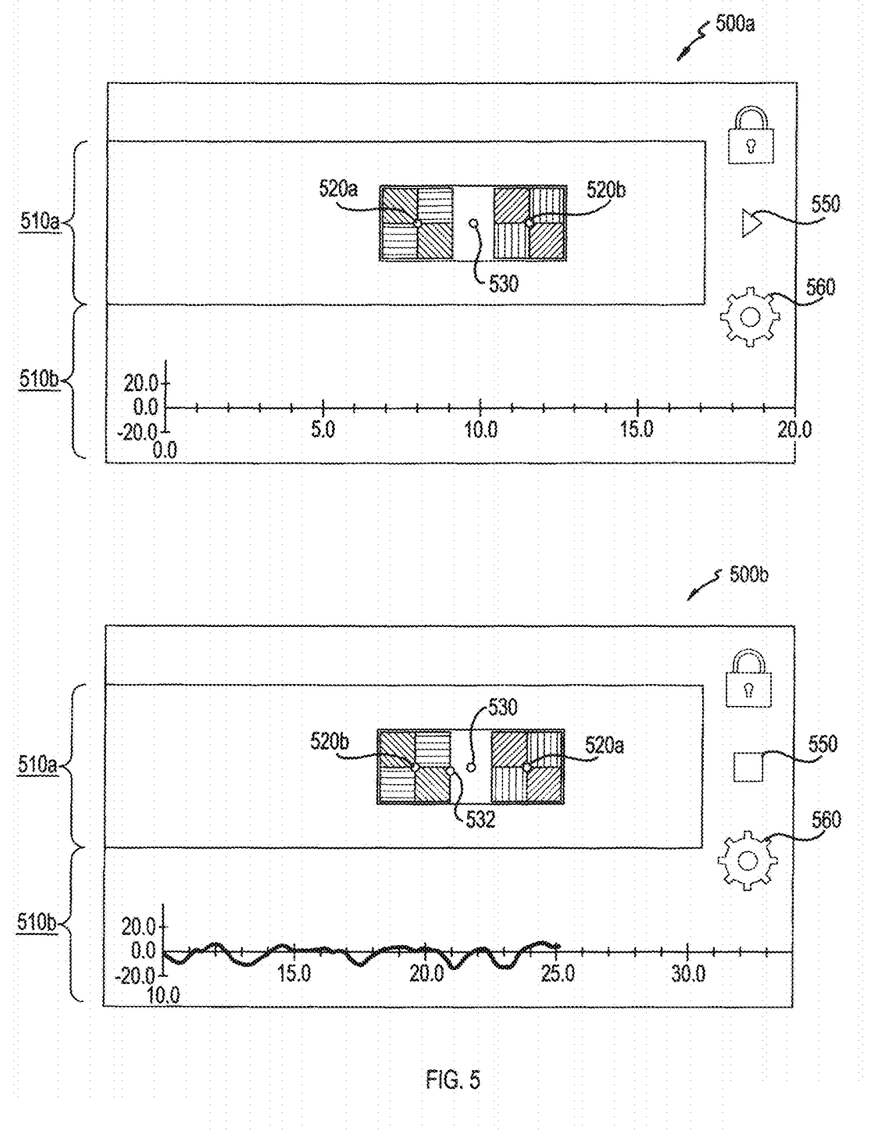
FIG. 5 are views of a graphical user interface according to an exemplary embodiment of the present invention.

FIG. 5 are views 500a and 500b of a graphical user interface according to an exemplary embodiment of the present invention. The views 500a and 500b may be output, for example, by the smartphone 200 via the display 280.

As shown in FIG. 5, the view 500a includes an image 510a and a graph 540a. As shown in FIG. 5, the view 500b similarly includes an image 510b and a graph 540b. The views 500a and 500b may also include icons (for example, a start icon 550 and a settings icon 560). The images 510a and 510b indicate the locations of the color-patterned targets 100a and 100b affixed to a structure. The images 510a and 520b may be pictures captured by the camera 260, processed by the one or more processors 220, and output by the display 480. Alternatively, the images 510a and 520b may be graphical representations of the color-patterned targets 100a and 100b rendered by the smartphone 200 based on the pictures captured by the camera 260.

In order to determine the dynamic displacement of the structure, the smartphone identifies the location of the center points 120a and 120b of the color-patterned targets 100a and 100b, and a midpoint 130 between the center points 120a and 120b. As shown in FIG. 5, the smartphone 200 may also superimpose a first dot 520a indicating the location of the center point 120a, a second dot 520b indicating the location of the center point 120b, and a third dot 530 indicating the location of the midpoint 130 between the center points 120a and 120b. As shown in FIG. 4B, the smartphone 200 may also superimpose a fourth dot 532 indicating the original location of the midpoint 130 in addition to the first dot 520a, the second dot 520b, and the third dot 530.

The graph 540b shows the dynamic displacement of the reference point over time. The graphical user interface may also display the average processing time for the smartphone to capture, filter, and display the image.

The graphical user interface may provide functionality for a user to adjust the setting of the software application. The user adjustable settings may include camera settings, filter settings, and graph settings. The camera settings may provide functionality for the user to adjust the frame rate (e.g., 30, 60, 120 and 240 frames per second, etc.), the crop size (e.g., a horizontal resolution of 100, 200, 400, 720, or 1280 pixels and/or a vertical resolution of 100, 200, 400, or 720 pixels, etc.), the auto focus (e.g., near, far, none), whether to output the images captured by the camera 260 via the display 280, and/or whether to display the processing time. The filter settings may provide functionality for the user to determine whether the resulting output from the OpenGL shader should be shown in place of the raw camera view, to determine the distance between neighboring pixels used in the OpenGL shader, and to select the hue ranges of the two colors used in each target. The graph settings may provide functionality for the user to determine whether the graph should be updated with displacement calculations from each frame, the distance (in centimeters) of the two colored targets in the camera frame, and whether the X, Y, or both displacement lines should be calculated and shown on the graph.

Experimental Validations

A new smartphone application was developed under iOS environment for the iPhone. A region/color-based tracking method was adapted because of its computational efficiency in image processing and robustness in tracking fast moving objects. In order to fully utilize the GPU capabilities of smartphones, the GPU Image library was used in developing the iOS app. A crop filter was implemented for users to compromise between the image size and frame rate without sacrificing accuracy. Onboard calibration of the image pixel size to a given-dimension target was implemented in the developed iOS app. And other various features for controlling camera, filter, and graph settings and email transmission of measured data were also incorporated in this iOS app development. In order to evaluate the performances of the iOS application, including sampling time accuracy and the ability to track the dynamic movements of targets, a series of laboratory-scale tests were carried out using a shaking table with single-frequency and multi-frequency sinusoidal motions. All functions required for measuring the dynamic movements of the target were successfully be operated in real time, allowing up to 120 frames per second (fps) with an iPhone 6 Plus. The performances of the iPhone hardware and the iOS application were experimentally validated.

An APS Dynamics' APS 400 Electro-Seis shaker was used for the evaluation tests. The input excitation of the shaker was amplified by the APS 145 amplifier. To compare the performance of the developed iOS App with that of a conventional displacement sensor, a laser displacement sensor (KEYENCE, IL-100, 4-μm resolution) was used as a reference. The analog voltage outputs from the laser sensor were measured by a National Instruments' NI-9234 ADC module (24-bit Delta-sigma ADC) with CompactDAQ chassis (cDAQ-9178 model). At the same time, a NI-9269 voltage output module, which was housed in the same CompactDAQ, was used to generate the excitation signals for the shaker. To overcome the limited resolution of the iPhone camera for long-distance and small-target measurements, a 50× optical zoom lens was used in conjunction with the iPhone. (Low-cost 12× and 50× optical zoom lens are commercially available with precisely designed smartphone cover cases that allow easy connection of the lens to the phone.)

Figure 6:
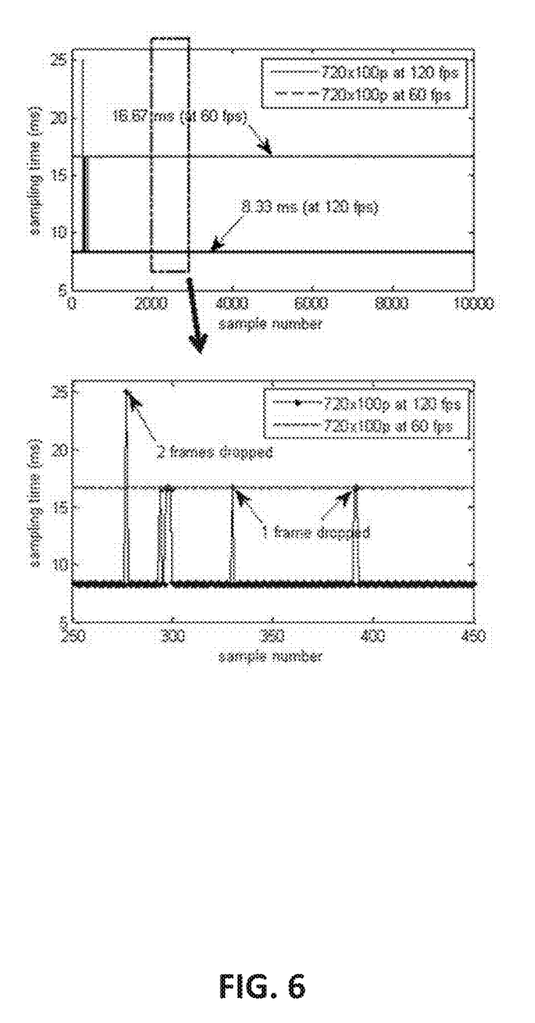
FIG. 6 is a graph illustrating the sampling time for 60 fps and 120 fps cases according to a validation of an exemplary embodiment.

Consistency of the sampling rate or sampling time is important to ensure the quality of dynamic vibration measurements. FIG. 6 shows the example record of the sampling time for 60 fps and 120 fps cases (720×100p crop filter used for both). The case with 60 fps (dotted line) shows very consistent sampling time of 16.67 milliseconds over entire measurements. However, when 120 fps (solid line) was used, little inconsistencies are observed in the beginning of the measurements for a couple of the samples, of which phenomenon is attributed by the dropped samples (see the bottom of FIG. 6). To achieve 120 fps, all the image processing required to get the displacement information should be done within 8.33 ms for each frame. If the processing takes more than 8.33 ms, then the software automatically drops the corresponding sample out, to not cause any delay or interference to following samples. Because the case of 60 fps ensures sufficient time for processing, such dropped samples were not observed in this test.

For the initial shake table tests indoors, the iPhone with the zoom lens was placed 3.0 meters away from the target attached on the shake table. The target size was 1.0×2.5 cm, which was composed of two rectangular alternating color patterns having 1.5 cm center distance between them. A 720×100p crop filter was used to track the target in a horizontal direction in an optimized way. The distance between the two color patterns (i.e. 1.5 cm) was occupied by about 300~400 pixels. A corresponding resolution for this particular set up could be estimated at about 0.0375~0.05 mm; actual size of each pixel was autonomously calibrated in the software and used for displacement calculation.

Figure 7:
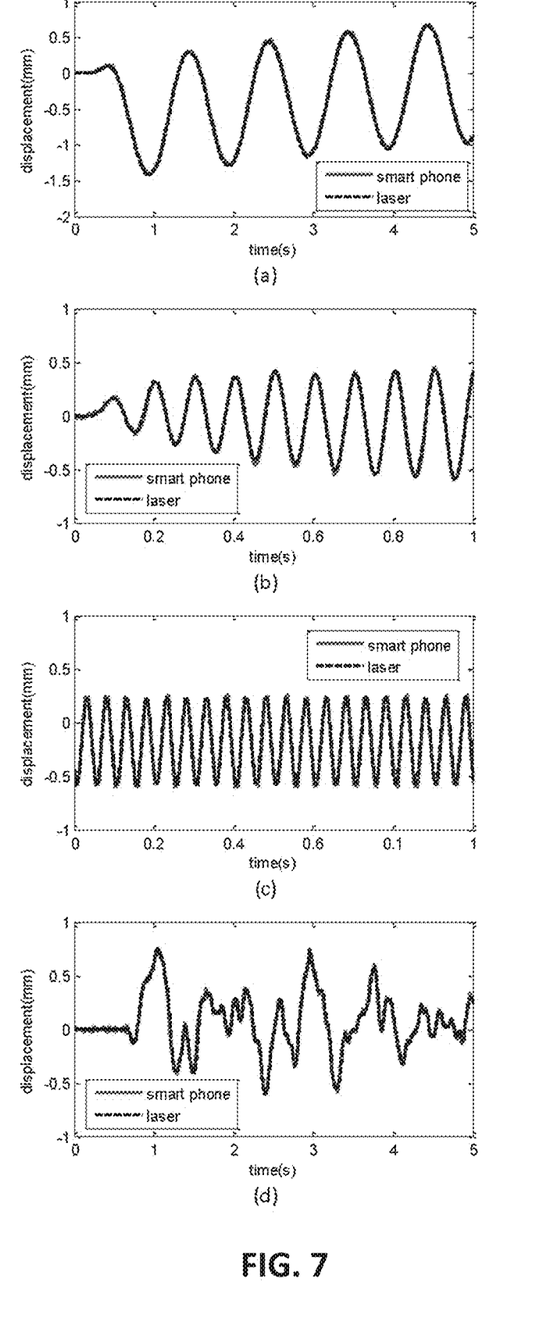
FIG. 7 is a graph illustrating the shake table test results according to a validation of an exemplary embodiment.

FIG. 7 shows the shake table test results for the (a) 1 Hz, (b) 10 Hz, and (c) 20 Hz sinusoidal excitations as well as (d) multi-tone excitation composed of 1-20 Hz (0.2 Hz step) sinusoidal signals. Vibration levels were kept below 2 mm amplitude (peak to peak), and 120 fps was used in this test. As shown in the FIG. 7, the dynamic displacements measured by the iPhone 6 Plus with the developed iOS app (solid line in the Figure) agree very well with those of the laser displacement sensor (dotted line in the Figure).

The shake table set ups were moved outdoors for outdoor testing with longer target distance. The shake table set ups were placed in the outdoor hallway of the civil engineering building at the University of Arizona, of which hallway can ensure up to 50 m clear line-of-sight. Target distance from the iPhone camera was 33 m and the same zoom lens was used, but with little bigger target (4×10 cm target size and 6 cm center distance between two color patterns).

Figure 8:
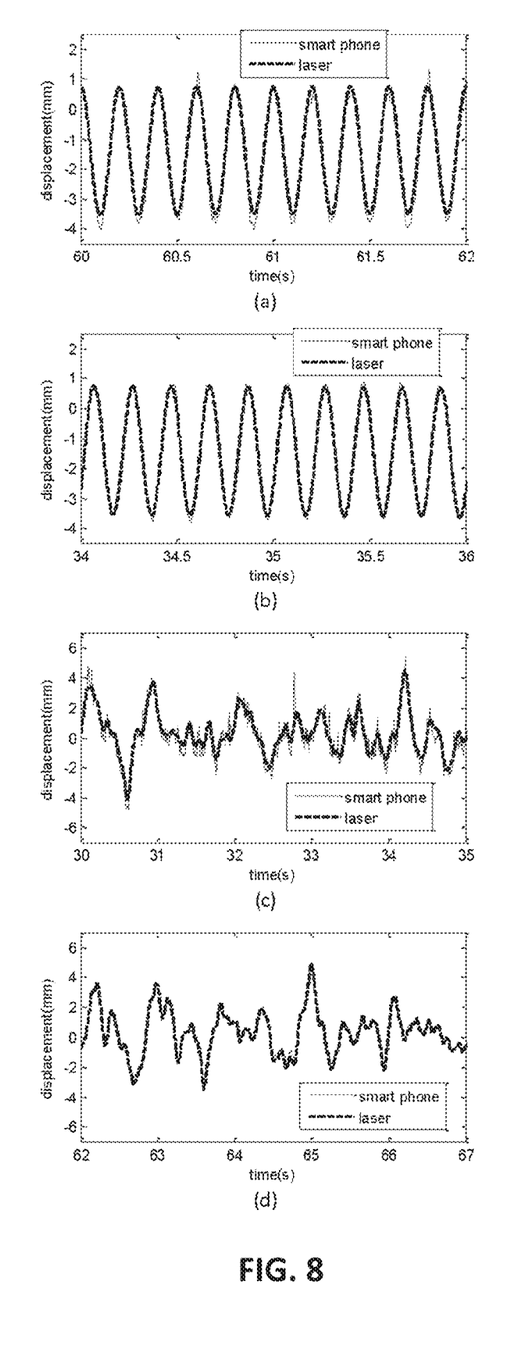
FIG. 8 is a graph illustrating outdoor shaking table tests according to a validation of an exemplary embodiment.

FIG. 8 shows some example results from the outdoor shaking table tests (33 m from target): (a) 5 Hz sine at 120 fps, (b) 5 Hz sine at 60 fps, (c) multi-tone sine at 120 fps, and (d) multi-tone sine signal at 60 fps. The performances of the iPhone with the developed app were not so impressive, compared with indoor tests. Particularly when 120 fps was used, substantial high-frequency noises were observed in the measurements by iPhone (solid line in the Figure) as shown in the FIGS. 8(a) and (c), while the results from 60 fps were acceptable, successfully resolving millimeter-level displacements. Possible reasons for these high-frequency noises in outdoor tests may be attributed to the possibility that the captured image at 120 fps might be exposed to less amount of light as the higher frame rate allows the shorter exposure time, which could change the color properties in the image, the possibility that the smartphone might be subjected to unexpected high-frequency vibrations due to wind and/or building vibrations, resulting in such noisy measurements (though it is a very little vibration, its effects on the captured images would be substantial as the target is located further and further away). No matter what the reasons for causing such high-frequency noises, possible vibrations of the phone itself should be compensated for the practical use of this approach for dynamic displacement measurements in the field. Other sensors (e.g., accelerometer, gyroscope) embedded in the smartphone may be utilized for the phone vibration compensation. To ensure sufficient amount of light for outdoor tests, a self-light emitting target (e.g., LED) may be used for future tests. In addition, a low-pass filtering can be implemented in the iOS app to reduce such high-frequency noises.

Although some high-frequency noises were observed from outdoor shake-table tests, the performances of the developed application were comparable to those of a conventional laser displacement sensor, allowing down to sub-millimeter resolutions at 33 m distance from the target.

The foregoing description and drawings should be considered as illustrative only of the principles of the inventive concept. Exemplary embodiments may be realized in a variety of shapes and sizes and are not intended to be limited by the preferred embodiments described above. Numerous applications of exemplary embodiments will readily occur to those skilled in the art. Therefore, it is not desired to limit the inventive concept to the specific examples disclosed or the exact construction and operation shown and described. Rather, all suitable modifications and equivalents may be resorted to, falling within the scope of this application.

What is claimed is:

1. A method of measuring displacement, the method comprising:
    capturing, by a stationary smartphone, a plurality of images of a moving object that includes at least one pattern with two rows and two columns, each column and each row including two contrasting colors;
    identifying, by the smartphone, a reference point of the moving object in the plurality of images; and
    measuring, by the smartphone, displacement of the reference point over time.

2. The method of claim 1, wherein the reference point is identified by a graphics processing unit of the smartphone.

3. The method of claim 1, wherein the contrasting colors have a hue value difference of approximately 180 degrees.

4. The method of claim 1, wherein identifying the reference point includes estimating a center of the at least one pattern.

5. The method of claim 4, wherein estimating the center of the at least one pattern includes identifying pixels near the center of the at least one pattern and determining an average location of the identified pixels.

6. The method of claim 5, wherein identifying pixels near the center of the at least one pattern comprises:
    converting pixel red-green-blue (RGB) values to hue values; and
    determining whether pixel hue values are within a predetermined range.

7. The method of claim 1, wherein:
    the moving object includes:
    a first pattern including two rows and two columns, each column and each row including a first color and second color contrasting with the first color; and
    a second pattern including two rows and two columns, each column and each row including a third color and a fourth color contrasting with the third color; and
    identifying the reference point includes:
    estimating a center of the first pattern;
    estimating a center of the second pattern; and
    estimating a midpoint between the center of the first pattern and the center of the second pattern.

8. The method of claim 1, wherein the images are captured by the smartphone at a frame rate of 120 images per second or more.

9. The method of claim 1, wherein the images are captured by the smartphone at a frame rate set by a user via the smartphone.

10. The method of claim 1, wherein the images are captured by the smartphone at a resolution of 720p or greater.

11. The method of claim 1, wherein the images are captured by the smartphone at a resolution set by a user via the smartphone.

12. The method of claim 1, further comprising cropping the plurality of images.

13. The method of claim 12, wherein the images are cropped such that one dimension of each cropped image is 100 pixels.

14. The method of claim 12, wherein the images are cropped such that at least one dimension of each image is set by a user via the smartphone.

15. The method of claim 1, further comprising:
    outputting, by the smartphone, the displacement of the reference point over time.

16. The method of claim 1, further comprising:
    graphing, by the smartphone, the displacement of the reference point over time.

17. The method of claim 1, wherein the smartphone is configured to provide functionality for cellular telephony, text messaging, or internet access.

18. A non-transitory computer readable storage medium (CRSM) that stores instructions that, when executed by one or more smartphone processors, cause the smartphone to:
    capture a plurality of images of a moving object that includes at least one pattern with two rows and two columns, each column and each row including two contrasting colors;
    identify a reference point of the moving object in the plurality of images; and
    measure displacement of the reference point over time.

19. A smartphone that measures displacement of a moving object, the smartphone comprising:
    one or more processors; and
    non-transitory computer readable storage medium that stores instructions that, when executed by the one or more smartphone processors, cause the smartphone to:
    capture a plurality of images of a moving object that includes at least one pattern with two rows and two columns, each column and each row including two contrasting colors;
    identify a reference point of the moving object in the plurality of images; and
    measure displacement of the reference point over time.

20. The CRSM of claim 18, wherein the instructions cause the smartphone to identify the reference point includes estimating a center of the at least one pattern.

* * * * *